(12) United States Patent
High et al.

(10) Patent No.: US 11,100,462 B2
(45) Date of Patent: Aug. 24, 2021

(54) SYSTEMS AND METHODS FOR FACILITATING DELIVERY OF PRODUCTS ORDERED OVER THE INTERNET TO CUSTOMERS

(71) Applicant: Walmart Apollo, LLC, Bentonville, AR (US)

(72) Inventors: Donald R. High, Noel, MO (US); Robert L. Cantrell, Herndon, VA (US); Michael D. Atchley, Eureka Springs, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/990,361

(22) Filed: Aug. 11, 2020

(65) Prior Publication Data

US 2020/0372455 A1    Nov. 26, 2020

Related U.S. Application Data

(63) Continuation of application No. 15/866,898, filed on Jan. 10, 2018, now abandoned.

(Continued)

(51) Int. Cl.
*G06Q 10/08* (2012.01)
*G06Q 30/06* (2012.01)
(Continued)

(52) U.S. Cl.
CPC ......... *G06Q 10/087* (2013.01); *B64C 39/024* (2013.01); *G06Q 10/0832* (2013.01);
(Continued)

(58) Field of Classification Search
CPC ............ G06Q 10/087; G06Q 10/0832; G06Q 30/0202; G06Q 30/0639; G06Q 30/0641;
(Continued)

(56) References Cited

U.S. PATENT DOCUMENTS 7,177,825 B1    2/2007    Borders
7,996,265 B2    8/2011    Evangelist
(Continued)

FOREIGN PATENT DOCUMENTS

WO    2015184237    12/2015
WO    2018132453    7/2018

OTHER PUBLICATIONS

Franco et al.; Allocation and Scheduling Processes; May 2, 2011 (Year: 2011).*

(Continued)

*Primary Examiner* — Florian M Zeender
*Assistant Examiner* — Nicole Elena Bruner
(74) *Attorney, Agent, or Firm* — Fitch, Even, Tabin & Flannery, LLP

(57) ABSTRACT

In some embodiments, methods and systems are provided for facilitating delivery of products purchased over the internet by the customers to the customers from a selected product stocking facility of the retailer. The products can be delivered to the customer from the selected product stocking facility of the retailer via a worker of the product stocking facility or an unmanned delivery vehicle.

16 Claims, 4 Drawing Sheets

Related U.S. Application Data

(60) Provisional application No. 62/445,103, filed on Jan. 11, 2017.

(51) Int. Cl.

| | | |
|---|---|---|
| *G06Q 30/02* | (2012.01) | |
| *H04W 4/35* | (2018.01) | |
| *B64C 39/02* | (2006.01) | |
| *G06Q 50/12* | (2012.01) | |
| *G06Q 10/06* | (2012.01) | |
| *G06Q 50/28* | (2012.01) | |

(52) U.S. Cl.
CPC ..... *G06Q 30/0202* (2013.01); *G06Q 30/0639* (2013.01); *G06Q 30/0641* (2013.01); *H04W 4/35* (2018.02); *B64C 2201/128* (2013.01); *G06Q 10/06* (2013.01); *G06Q 50/12* (2013.01); *G06Q 50/28* (2013.01)

(58) Field of Classification Search
CPC ........ G06Q 10/06; G06Q 50/12; G06Q 50/28; H04W 4/35; B64C 39/024; B64C 2201/128
USPC .......................................................... 705/28
See application file for complete search history.

(56) References Cited

U.S. PATENT DOCUMENTS

| | | | |
|---|---|---|---|
| 9,934,530 B1* | 4/2018 | Iacono | ............... G06Q 30/0639 |
| 10,242,336 B1 | 3/2019 | Agarwal | |
| 10,319,053 B1 | 6/2019 | Kohli | |
| 10,489,739 B2 | 11/2019 | Streebin | |
| 10,535,036 B2* | 1/2020 | Cantrell | .................. H04W 4/35 |
| 10,553,122 B1 | 2/2020 | Gilboa-Amir | |
| 2003/0171996 A1 | 9/2003 | Chen | |
| 2005/0288989 A1 | 12/2005 | Kim | |
| 2008/0052205 A1 | 2/2008 | Dolley | |
| 2008/0252417 A1 | 10/2008 | Thomas | |
| 2013/0151381 A1 | 6/2013 | Klein | |
| 2014/0188755 A1 | 7/2014 | Viswanath | |
| 2014/0279294 A1 | 9/2014 | Field-Darragh | |
| 2015/0356501 A1 | 12/2015 | Gorjestani | |
| 2016/0232479 A1* | 8/2016 | Skaaksrud | ........... G06Q 10/087 |
| 2016/0247109 A1* | 8/2016 | Scicluna | .......... G06Q 10/06315 |
| 2017/0069214 A1* | 3/2017 | Dupray | ................ G08G 5/0013 |
| 2018/0096287 A1 | 4/2018 | Senger | |
| 2018/0197137 A1 | 7/2018 | High | |
| 2018/0240181 A1 | 8/2018 | Lopez | |
| 2019/0114564 A1 | 4/2019 | Ferguson | |

OTHER PUBLICATIONS

"How will Amazon.com be able to offer sameday delivery?"; https://www.quora.com/How-will-Amazon-com-be-able-to-offer-same-day-delivery; Jul. 20, 2012; pp. 1-8.

Iyengar, Prasanna; "The Challenges of Cross-Channel Fulfillment to the Retail Supply Chain—Part II"; Tata Consultancy Services; 2013; pp. 1-12.

Michel, Roberto; "Last Mile E-Commerce Delivery Success Starts Early"; http://www.supplychain247.com/article/last_mile_ecommerce_delivery_success_starts_early; Jun. 19, 2015; pp. 1-6.

PCT; App. No. PCT/US2018/013133; International Preliminary Report on Patentability dated Jul. 25, 2019.

PCT; App. No. PCT/US2018/013133; International Search Report and Written Opinion dated Apr. 13, 2018.

U.S. Appl. No. 15/866,898; Notice of Allowance dated May 11, 2020, (pp. 1-15).

U.S. Appl. No. 15/866,898; Office Action dated Feb. 20, 2020; (pp. 1-24).

U.S. Appl. No. 15/866,898; Office Action dated Mar. 23, 2020; (pp. 1-12).

* cited by examiner

SYSTEMS AND METHODS FOR FACILITATING DELIVERY OF PRODUCTS ORDERED OVER THE INTERNET TO CUSTOMERS

CROSS-REFERENCE TO RELATED APPLICATION

This application is a continuation of U.S. application Ser. No. 15/866,898, filed Jan. 10, 2018, which claims the benefit of U.S. Provisional Application No. 62/445,103, filed Jan. 11, 2017, each of which is incorporated herein by reference in its entirety.

TECHNICAL FIELD

This invention relates generally to facilitating delivery of products to customers and, in particular, to facilitating delivery of internet-ordered products to the customers from product stocking facilities of the retailers.

BACKGROUND

Customers often purchase products from retailers over the internet. Retail stores stock products on the sales floor for display to in-store customers and offer products on their websites to online customers, often fulfilling the online orders by picking products from the stock room and/or the sales floor of the retail store. In the meantime, in-store customers buy products on the sales floor or a retail store and, in response to such sales, products are moved from the stock room of the store to the sales floor of the retail store to replenish the stock of the products on the sales floor. Combining in-store and online sales is associated with certain inefficiencies arising when inventory is stocked in one place for one purpose (e.g., on sales floor display) and then repositioned to fill another purpose (e.g., fulfill an online-placed order). For example, if a worker at a retail store places a product picked from the stock room onto a shelf on the sales floor of the retail store and then retrieves that same product from the shelf on the sales floor to fulfill an online order, the cost to have that product moved to the sales floor shelf and to move that product from the shelf and to again replenish the shelf is wasted. Such inefficiencies can add up, lowering profit margins for the retailers and/or requiring higher prices.

BRIEF DESCRIPTION OF THE DRAWINGS

Disclosed herein are embodiments of systems, apparatuses, methods, and systems pertaining to product purchases made by the customers over the internet and to delivering such products to the customers from product stocking facilities of the retailer via a worker of a product stocking facility or an unmanned delivery vehicle. This description includes drawings, wherein.

Figure 1:
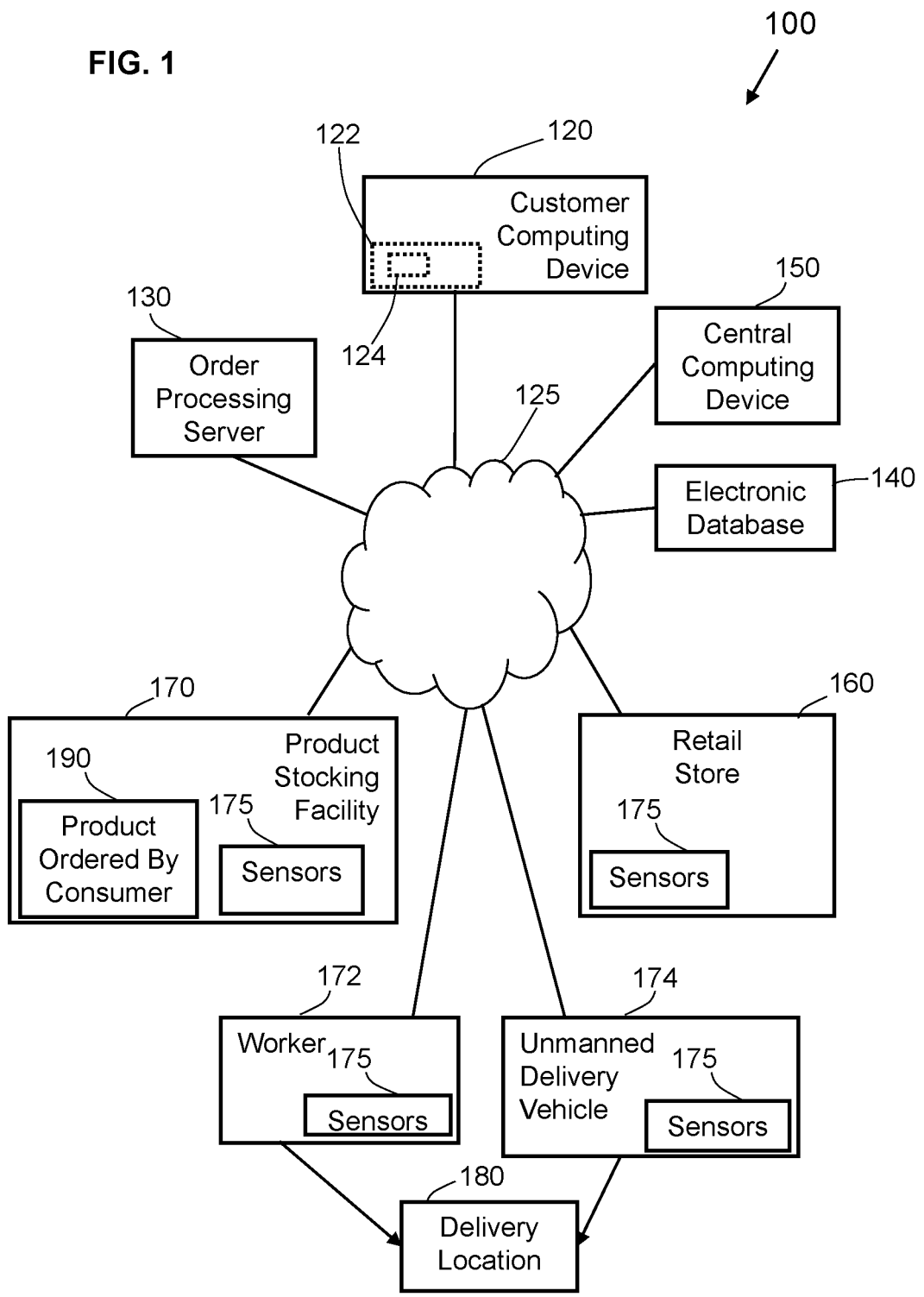
FIG. 1 is a diagram of a system of facilitating delivery of products purchased by the customers over the internet from product stocking facilities of the retailer via a worker of a product stocking facility or an unmanned delivery vehicle in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for facilitating delivery of products purchased by the customers over the internet from product stocking facilities of the retailer. The products can be delivered from the product stocking facility of the retailer via a worker of a product stocking facility or an unmanned delivery vehicle. In some aspects, on-line order fulfillment takes place at a product stocking facility such as a fulfillment center or distribution center. As such, rather than take products that have been inventoried or shelved for in-store shoppers, products can be picked and/or aggregated at product stocking facilities separate from the retail store and delivered to the online shoppers from such product stocking facilities. The products can be delivered from the product stocking facilities to the customers by workers of such product stocking facilities or by unmanned delivery vehicles. Notably, the systems and methods described herein do not preclude filling online orders using products in stock (e.g., on the sales floor or in stock room) at a retail store when such fulfillment is calculated to be most efficient or necessary to meet service-level commitments.

In some embodiments, a system for facilitating delivery to customers of products purchased by the customers from a retailer via internet-based orders comprises an order processing server configured to process an internet-based order for at least one product placed by a customer from the retailer and an electronic database storing inventory management data. The inventory management data includes: data indicating geographic locations of a plurality of retail stores and product stocking facilities of the retailer where the at least one product is stocked, on-hand inventory at the retail stores and the product stocking facilities where the at least one product is stocked, size and weight information associated with the at least one product ordered by the customer, and a time frame within which the at least one product is to be delivered to the customer; data indicating geographic locations and pending tasks of workers at the retail stores and at the product stocking facilities of the retailer, geographic locations and pending tasks of unmanned delivery vehicles, and size and weight information associated with vehicles of the workers and with the unmanned delivery vehicles, the workers and the unmanned delivery vehicles available to deliver the at least one product to the customer from the retail stores and the product stocking facilities of the retailer where the at least one product is stocked. The system further includes a computing device in communication with the order processing server and electronic database. The computing device including a processor-based control circuit and configured to: obtain the inventory management data from at least one of: sensors associated with retail stores, sensors associated with the product stocking facilities, sensors associated with the vehicles of the workers, sensors associated with the unmanned delivery vehicles, and the electronic database and, based on the obtained inventory management data to: generate a list of the unmanned delivery vehicles and the workers at the retail stores and at the product stocking facilities of the retailer that are capable of delivering the at least one product to the customer within the time frame within which the at least one product is to be delivered to the customer; determine a delivery risk associated with delivering the at least one product to the customer within the time frame via each of the unmanned delivery vehicles and each of the workers on the generated list; determine a cost of delivering the at least one product to the customer within the time frame via each of the unmanned delivery vehicles and each of the workers on the generated list; select, from the plurality of the retail stores and the product stocking facilities of the retailer stored in the electronic database, a retail store or a product stocking facility of the retailer associated with a lowest delivery risk and a lowest delivery cost as the retail store or the product stocking facility from which to deliver the at least one product to the customer; select, from the available workers and unmanned delivery vehicles indicated by the electronic database, a worker or unmanned delivery vehicle associated with the lowest delivery risk and the lowest delivery cost as the worker or unmanned delivery vehicle to deliver the at least one product to the customer from the selected retail store or the selected product stocking facility; and transmit an electronic notification to the selected worker or unmanned delivery vehicle, the electronic notification indicating a delivery address of the customer.

In other embodiments, a method for facilitating delivery to customers of products purchased by the customers from a retailer via internet-based orders comprises: providing an order processing server configured to process an internet-based order for at least one product placed by a customer from the retailer; providing an electronic database storing inventory management data including: data indicating geographic locations of a plurality of retail stores and product stocking facilities of the retailer where the at least one product is stocked, on-hand inventory at the retail stores and the product stocking facilities where the at least one product is stocked, size and weight information associated with the at least one product ordered by the customer, and a time frame within which the at least one product is to be delivered to the customer; data indicating geographic locations and pending tasks of workers at the retail stores and at the product stocking facilities of the retailer, geographic locations and pending tasks of unmanned delivery vehicles, and size and weight information associated with vehicles of the workers and with the unmanned delivery vehicles, the workers and the unmanned delivery vehicles available to deliver the at least one product to the customer from the retail stores and the product stocking facilities of the retailer where the at least one product is stocked; and providing a computing device in communication with the order processing server and electronic database, the computing device including a processor-based control circuit and configured to: obtain the inventory management data from at least one of: sensors associated with retail stores, sensors associated with the product stocking facilities, sensors associated with the vehicles of the workers, sensors associated with the unmanned delivery vehicles, and the electronic database and, based on the obtained inventory management data to: generate a list of the unmanned delivery vehicles and the workers at the retail stores and at the product stocking facilities of the retailer that are capable of delivering the at least one product to the customer within the time frame within which the at least one product is to be delivered to the customer; determine a delivery risk associated with delivering the at least one product to the customer within the time frame via each of the unmanned delivery vehicles and each of the workers on the generated list; determine a cost of delivering the at least one product to the customer within the time frame via each of the unmanned delivery vehicles and each of the workers on the generated list; select, from the plurality of the retail stores and the product stocking facilities of the retailer stored in the electronic database, a retail store or a product stocking facility of the retailer associated with a lowest delivery risk and a lowest delivery cost as the retail store or the product stocking facility from which to deliver the at least one product to the customer; select, from the available workers and unmanned delivery vehicles indicated by the electronic database, a worker or unmanned delivery vehicle associated with the lowest delivery risk and the lowest delivery cost as the worker or unmanned delivery vehicle to deliver the at least one product to the customer from the selected retail store or the selected product stocking facility; and transmit an electronic notification to the selected worker or unmanned delivery vehicle, the electronic notification indicating a delivery address of the customer.

FIG. 1 shows an embodiment of a system 100 for facilitating delivery of products 190 purchased by customers over an internet-based network to the customers from a product stocking facility 170 or retail store 160 of the retailer. The product stocking facility 170 can include but is not limited to a distribution center of the retailer, a fulfillment center of the retailer, or a mobile storage station of the retailer where products 190 offered for sale to online customers can be stocked. The retailer may be any entity operating as a brick-and-mortar physical location and/or a website accessible, for example, via the internet or another network, by way of which products 190 may be ordered by a customer. A customer may be an individual or business entity. Exemplary products 190 that may be ordered by the customer via the system 100 may include, but are not limited to, general-purpose consumer goods, as well as consumable products, such as medications, food items, and dietary supplements.

The exemplary system 100 depicted in FIG. 1 includes an order processing server 130 of the retailer configured to process an internet-based order for one or more products 190 placed by a customer of the retailer. The order processing server 130 may be implemented as one server at one location, or as multiple interconnected servers stored at multiple locations operated by or for the retailer. As described in more detail below, the order processing server 130 may communicate with one or more electronic devices of system 100 via a network 125. The network 125 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to an electronic database 140. In some embodiments, the electronic database 140 may be configured to store information associated with a customer of the retailer who orders products 190 from the retailer. In some embodiments, the electronic database 140 may store the customer's personal information, product order history, pending order status, product order options, as well as product delivery and/or pick-up options (which may be entered into the electronic database 140 as described in more detail below). The electronic database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the electronic database 140 may likewise be cloud-based. In some embodiments, the order processing server 130 may be also coupled to a separate electronic database configured to store information associated with the inventory of products 190 available to the customer for purchase from the retailer and stocked at retail stores 160 of the retailer and/or product stocking facilities 170 of the retailer. In other words, while the order processing server 130 is illustrated in FIG. 1 as being coupled to one electronic database 140, it will be appreciated that the order processing server 130 may be coupled to two or more electronic databases configured to store customer information and/or product inventory information.

In some embodiments, inventory management data stored on the electronic database 140 includes data indicating geographic locations of the of retail stores 160 and product stocking facilities 170 of the retailer where one or more products 190 ordered by the customer are stocked. In one aspect, the inventory management data stored on the electronic database 140 includes data indicating the on-hand inventory at the retail stores 160 and the product stocking facilities 170 where the product(s) 190 ordered by the customer is/are stocked. In some embodiments, the electronic database 140 also includes size and weight information associated with one or more products 190 ordered by the customer 190, and a time frame (e.g., same day, 2 days, etc.) within which the product(s) 190 is/are to be delivered to the customer. In addition, in some embodiments, the electronic database 140 includes data indicating geographic locations and pending tasks of workers 172 of the retail stores 160 and product stocking facilities 170, size and weight information associated with vehicles (e.g., company cars, personal cars, etc.) of the workers 172 and with the unmanned delivery vehicles 174, as well as geographic locations and pending tasks of unmanned delivery vehicles 174 implemented for delivering products from retail stores 160 and product stocking facilities 170. In some aspects, the electronic database 140 further includes data indicating a listing of workers 172 and unmanned delivery vehicles 174 available to deliver the product(s) 190 ordered by the customer from either one or more retail stores 160 and/or product stocking facilities 170 where such product(s) 190 is/are stocked.

In one aspect, the electronic database 140 includes customer demand forecast data associated with the products 190 stocked at the retail stores 160 of the retailer and the product stocking facilities 170. For example, in some aspects, the system 100 includes automated inventory forecasting tools (which may be incorporated into the central computing device 150 or implemented via separate computing devices) that that take into account the separation of online order fulfillment and in-store purchase fulfillment, and allocate products 190 to retail stores 160 and product stocking facilities 170 to accommodate anticipated consumer demand and ensure that the retail stores 160 and product stocking facilities 170 have sufficient quantities of product on-hand for in-store customers and online deliveries. For example, such forecasting tools can result in inventory dedicated to fill online sales to be added to the product stocking facilities 170, such that there is less need to draw inventory from shelves on the sales floor of the retail store 160.

In some embodiments, when a customer initially sets up an online account with the retailer, for example, using a customer computing device 120, the system 100 (i.e., order processing server 130 or another server on the system 100 dedicated to new customer sign-up) is configured to permit the customer to generate a customer profile including personal information of the customer (e.g., name, address, phone number, and the like), payment methods (e.g., credit card information), as well as product delivery settings of the customer (e.g., authorizing delivery of the products 190 via a worker 172 of a retail store 160 or product stocking facility 170 and/or authorizing delivery of the products 190 by an unmanned delivery vehicle 174). The customer may select new options and/or update previously selected options at any time after setting up the account with the retailer. In some embodiments, the personal information of the customer and any product pick up-related options selected by the customer are stored in the electronic database 140 for subsequent retrieval by the order processing server 130 and/or by a central computing device 150 (e.g., in response to a login request or product order placement by the customer).

In some embodiments, as the customer is connecting to the retailer's website (e.g., via a login interface) using the customer computing device 120, the order processing server 130 may request a verification of the identity (e.g., username/password) of the customer. The order processing server 130 may first verify the identity of the customer (e.g., by comparing the username/password data entered by the customer into the login interface against username/password data in the profile of the customer stored in the electronic database 140. The order processing server 130 may then associate the customer profile with the identity of the customer, retrieve the customer profile from the electronic database 140 based on information stored in the profile, and send the retrieved customer account information to the customer computing device 120, which includes a graphical interface 122 (described in more detail below) that permits the customer to customize various options relating to the ordering of products 190 from the retailer and/or relating to delivery options for the products 190 to the customer.

The customer may access the order processing server 130 of the retailer via a customer computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130. In some embodiments, the customer may access the order processing server 130 of the retailer via a graphical interface 122 displayed to the customer on the customer computing device 120. The graphical interface 122 may include one or more graphical input fields 124 in the form of menu options and/or sub-interfaces that permit the customer to place an order for one or more products 190 and to select a delivery location 180 for one or more products 190 ordered by the customer. In some embodiments, the graphical interface 122 may be a retailer-associated mobile application (app) installed on the customer computing device 120 and configured to display various above-described menu options, notifications, and/or alerts for the customer. For example, electronic alerts may be transmitted to the customer computing device 120 from the central computing device 150 and/or from the order processing server 130 and displayed on the customer computing device 120 via the graphical interface 122.

In some embodiments, after placing an on order for one or more products 190 via the order processing server 130 using the graphical interface 122 of the customer computing device 120, the customer does not elect to pick up the ordered products 190 at the retail store 160, but selects an option to have the ordered products 190 delivered to the customer. In some embodiments, the order processing server 130 permits the customer to select an option requiring delivery of the products 190 ordered by the customer from the specific facility (i.e., specific retail store or specific product stocking facility 170). For example, the order processing server 130 can be configured to permit the customer to elect an option requiring that delivery of the product 190 to be from the retail store 160 (not the product stocking facility 170) geographically closest to the delivery location 180 designated by the customer. In one aspect, such a manual election by the customer of the precise facility from which the product 190 ordered by the customer is delivered to the delivery location 180 designated by the customer is associated with a delivery surcharge payable by the customer via the order processing server 130.

In some aspects, the order processing server 130 is configured to receive and process an order by the customer for a product 190 from the customer computing device 120, to receive and process payment for the product 190 from the customer, and to transmit the customer's election having the product delivered to the customer based on the processed order (e.g., via the network 125) to a central computing device 150 that is configured for communication with the order processing server 130 and electronic database 140, as well as with the retail store 160 and product stocking facility 170 of the retailer associated with a geographic location of the customer. It will be appreciated that while the order processing server 130 and the central computing device 150 may be located at separate physical locations (e.g., regional data center, central data center, or the like), the system 100, in some embodiments, may be confined to a single facility of the retailer.

The central computing device 150 may be a stationary or portable electronic device, for example, a desktop computer, a laptop computer, a tablet, a mobile phone, or any other electronic device including a processor-based control circuit (i.e., control unit). In the embodiment of FIG. 1, the central computing device 150 is configured for data entry and processing as well as for communication with other devices of system 100 via the network 125 which, as described above, may be a wide-area network (WAN), a local area network (LAN), a personal area network (PAN), a wireless local area network (WLAN), or any other internet or intranet network, or combinations of such networks.

Figure 2:
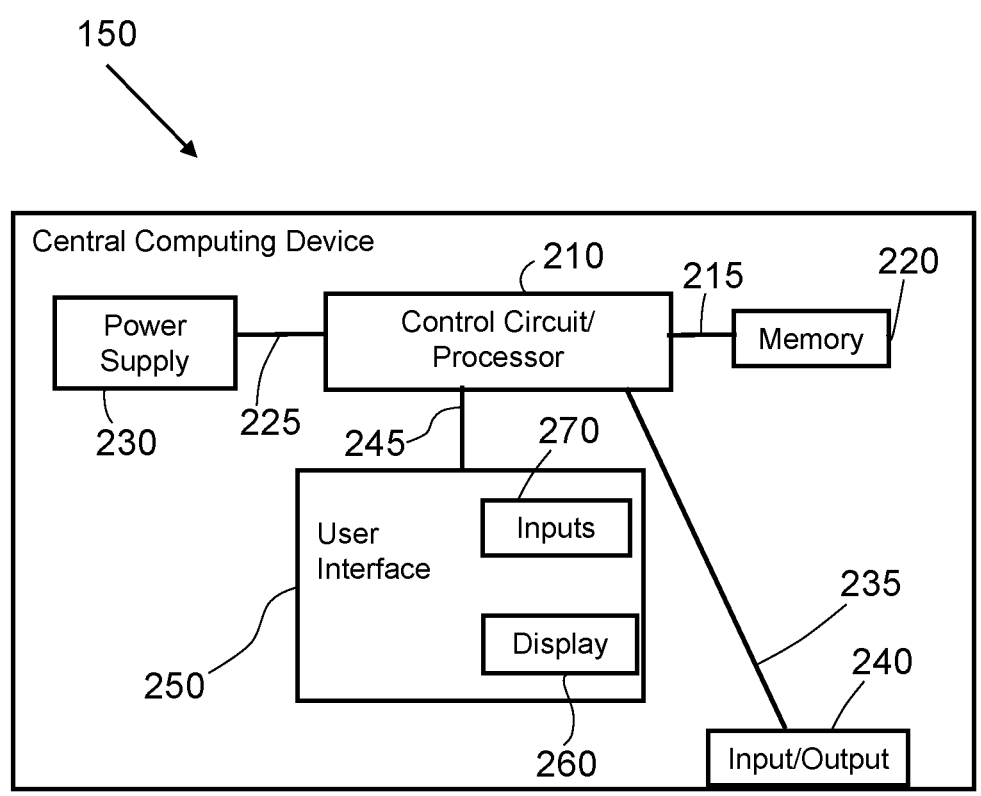
FIG. 2 is a functional diagram of an exemplary computing device usable with the system of FIG. 1 in accordance with some embodiments.

With reference to FIG. 2, an exemplary central computing device 150 configured for use with exemplary systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the central computing device 150 is also electrically coupled via a connection 235 to an input/output 240 that can receive signals from the order processing server 130 (e.g., data from the electronic database 140 relating to a product order placed by the customer) or from any other source (e.g., computing device at the retail store 160, computing device at the product stocking facility 170, electronic device of a worker 172, unmanned delivery vehicle 174, etc.) that can communicate with the central computing device 150 via a wired or wireless connection. The input/output 240 of the central computing device 150 can also send signals to the order processing server 130 (e.g., data including product out-of-stock information regarding the product for which an order is placed by the customer via the order processing server 130, data indicating that the products 190 ordered by the customer have been successfully delivered to the customer, etc.), or to any other electronic device in wired or wireless communication with the central computing device 150.

In the embodiment shown in FIG. 2, the processor-based control unit 210 of the central computing device 150 is electrically coupled via a connection 245 to a user interface 250, which may include a visual display or display screen 260 (e.g., LED screen) and/or button input 270 that provide the user interface 250 with the ability to permit an operator of the central computing device 150 to manually control the central computing device 150 by inputting commands via touch-screen and/or button operation and/or voice commands to, for example, to select a retail store 160 or a product stocking facility 170 from which to deliver the product 190 ordered by the customer to the delivery location 180 designated by the customer, and/or to select a worker 172 or unmanned delivery vehicle via which to deliver the product 190 ordered by the customer to the delivery location 180 designated by the customer. It will be appreciated that the performance of such functions by the processor-based control unit 210 of the central computing device 150 is not dependent on a human operator, and that the control unit 210 may be programmed to perform such functions without a human operator.

In some embodiments, the display screen 260 of central computing device 150 is configured to display various graphical interface-based menus, options, and/or alerts that may be transmitted to the central computing device 150 and displayed on the display screen 260 in connection with various aspects of the order placed by the customer. The inputs 270 of the central computing device 150 may be configured to permit an operator to navigate through the on-screen menus on the central computing device 150 and select which worker 172 and/or which unmanned delivery vehicle 174 will deliver the products 190 ordered by the customer to the customer. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the central computing device 150 is programmed to obtain inventory management data from the electronic database 140 via the network 125. In certain implementations, based on the data obtained from the electronic database 140, the control circuit 210 of the central computing device 150 is programmed to perform an analysis that enables the control circuit 210 to arrive at a decision from which retail store 160 or product stocking facility 170 and via which worker 172 or unmanned delivery vehicle 174 the product 190 will be delivered to the customer. For example, in one embodiment, the control circuit 210 is programmed to generate a list of the unmanned delivery vehicles 174 and the workers 172 at the retail stores 160 and at the product stocking facilities 170 of the retailer that are capable of delivering the product 190 (e.g., by having cargo space with sufficient size and weight parameters to accommodate the product 190) to the customer within the time frame within which the at least one product is to be delivered to the customer (e.g., time specified by the customer when placing the order). In one embodiment, based on the data obtained from the electronic database 140, the control circuit 210 of the central computing device 150 is programmed to determine a cost (i.e., monetary cost) of delivering the product 190 to the customer within the time frame via each of the unmanned delivery vehicles 174 and each of the workers 172 on the generated list, then determine a risk factor (e.g., likelihood of successful delivery, potential liabilities, etc.) associated with delivering the product 190 to the customer within the time frame via each of the unmanned delivery vehicles 174 and each of the workers 172 on the generated list, and to generate a combined cost-risk factor score for each of the unmanned delivery vehicles 174 and each of the workers 172 on the generated list. In some aspects, based on the inventory management data obtained from the electronic database 140 and based on ranking the generated combined cost-risk factor scores, the control circuit 210 of the central computing device 150 is programmed to select, from the retail stores 160 and product stocking facilities 170 of the retailer stored in the electronic database 140, a retail store 160 or a product stocking facility 170 associated with a highest cost-risk factor score as the retail store 160 or product stocking facility 170 from which to deliver the customer-ordered product(s) 190 to the delivery location 180 designated by the customer. In one aspect, based on the inventory management data obtained from the electronic database 140 and based on ranking the generated combined cost-risk factor scores, the central computing device 150 is configured to select, from the available workers 172 and unmanned delivery vehicles 174 listed in the electronic database 140, a worker 172 or unmanned delivery vehicle 174 associated with the highest cost-risk factor score as the worker 172 or unmanned delivery vehicle 174 to deliver the product 190 to the customer from the retail store 160 or product stocking facility 170 selected by the central computing device 150.

Figure 4:
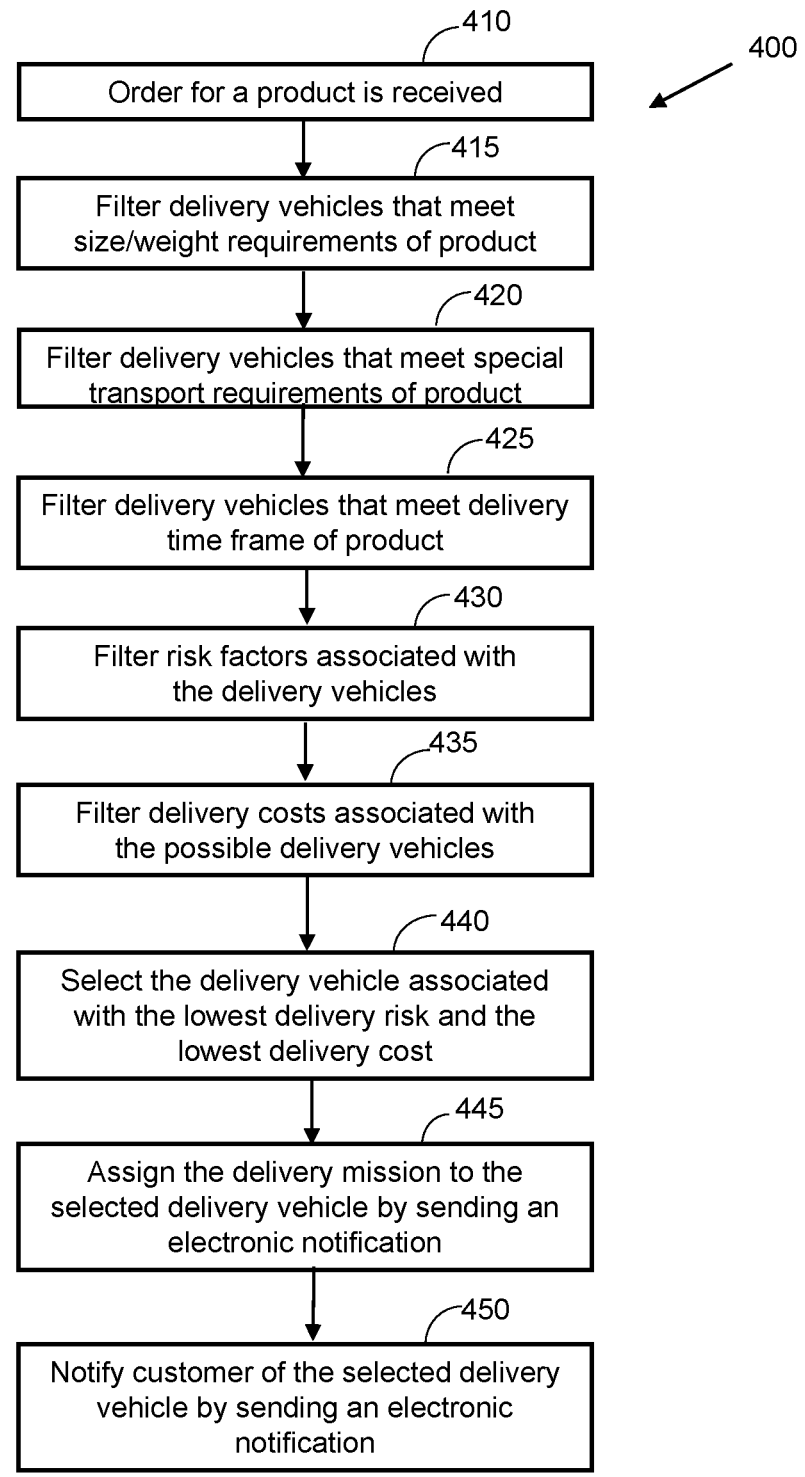
FIG. 4 is another flow chart diagram depicting the facilitating of delivery of products purchased by the customers over the internet from product stocking facilities of the retailer via a worker of a product stocking facility or an unmanned delivery vehicle in accordance with some embodiments.

An exemplary flow chart illustrating process flow 400 of facilitating delivery to a customer of a product 190 purchased by the customer from a retailer via an internet-based order is depicted in FIG. 4. With reference to FIG. 4, first, an internet-based order for one or more products 190 is placed by a customer (step 410). For example, the product 190 is a pint of ice cream, and the customer specifies that the product 190 is to be delivered to a location specified by the customer within an hour, which requires the control circuit 210 of the central computing device to identify a vehicle having matching storage capacity, storage conditions (i.e., freezer for ice cream), and is situated such that it is capable of delivering the product 190 to the customer within one hour to properly fulfill the order. In the embodiment specified in FIG. 4, as an initial step in facilitating delivery of the ice cream to the customer, the control circuit 210 of the central computing device 150 is programmed to run a first filter through the electronic database 140-stored size and weight information (i.e., conveyance capacity data) associated with the vehicles (e.g., company cars, personal cars, etc.) of the workers 172 and associated with the unmanned delivery vehicles 174 (step 415) in order to identify the vehicles listed in the electronic database 140 that meet the size and weight requirements for delivering the product 190 ordered by the customer. For example, after application of the first filter by the control circuit 210, a list of available vehicles that meet the size and weight requirements for delivering the pint of ice cream to the customer may include: a Walmart truck, third-party logistics (3PL) truck, U.S. Postal Service (USPS) truck, worker 172 (in his or her private vehicle), crowd Source, unmanned aerial vehicle (UAV) 174, autonomous ground vehicle (AGV), and currier.

In the embodiment illustrated in FIG. 4, after obtaining the first filter-based results, the control circuit 210 of the central computing device 150 is programmed to run a second filter through the electronic database 140-stored special storage capabilities (e.g., refrigeration, freezer, environmental controls, product handling methods, security, etc.) associated with the first filter-retrieved vehicles (step 420) in order to identify the vehicles listed in the electronic database 140 that meet the special requirements for delivering the ice cream ordered by the customer. In this example, for instance, the second filter would knock out 3PL trucks and USPS trucks because they will be determined by the control circuit 210 to be too slow to keep the ice cream from melting.

In the exemplary embodiment shown in FIG. 4, the control circuit 210 is also programmed to run a third filter through the electronic database-140 stored pending tasks/availability, product loading times, physical locations, and route conditions of the remaining available vehicles in order to determine which of these vehicles are capable of delivering the product 190 to the customer within the one hour specified by the customer (step 425). This filter would eliminate vehicles that have pending tasks that would prevent them from picking up and delivering the product 190 to the customer within one hour, or vehicles that are too far from the customer's designated delivery location to deliver the product 190 to the customer within the time frame specified by the customer. In another example, this third filter may filter out a given worker 172 at a product stocking facility 170 because the associate is not finishing her or her shift within the next hour.

After the control circuit 210 runs the three aforementioned filters to arrive at a list of vehicles that meet the size/weight requirements, product handling requirements, and delivery speed requirements, in some embodiments, the control circuit 210 is further programmed to run a risk threshold filter in association with each of the remaining vehicles with respect to the mission of delivering the pint of ice cream to the customer within one hour. For example, in the exemplary embodiment illustrated in FIG. 4, the control circuit 210 of the central computing device 150 is programmed to run a fourth filter through the electronic database 140-stored risk factors (e.g., commercial performance (e.g., financial) risks, mission performance (e.g., not making the delivery in time) risks, catastrophic risks (e.g., traffic conditions, financial liability in case of accident), etc.) associated with assigning a given vehicle the mission to deliver the pint of ice cream to the customer within one hour (step 430) in order to identify the vehicles listed in the electronic database 140 that meet the additional conveyance risk factors special requirements for delivering the ice cream ordered by the customer. In one exemplary scenario, for instance, the fourth filter would knock out AGV because the customer lives in a high-traffic area that the present AGV cannot safely handle based on previous analysis by the control circuit 210 of the region stored in the electronic database 140, leaving the only two possible remaining choices as the UAV 172 and the worker 174 who works at a given product stocking facility 170.

After the control circuit 210 runs the four aforementioned filters to arrive at a list vehicles that meet the size/weight requirements, product handling requirements, delivery speed requirements, and risk score requirements, the control circuit 210 is further programmed to run a cost analysis in association with each of the remaining vehicles with respect to the mission of delivering the pint of ice cream to the customer within one hour. For example, in the exemplary embodiment illustrated in FIG. 4, the control circuit 210 of the central computing device 150 is programmed to run a fifth, cost-efficiency filter through the electronic database 140-stored cost factors (e.g., (e.g., distance to be traveled from vehicle location to delivery location, size of load, time of travel, fuel cost, etc.) associated with assigning a given vehicle the mission to deliver the pint of ice cream to the customer within one hour (step 435) in order to identify the vehicle listed in the electronic database 140 that has the lowest cost of delivering the ice cream ordered by the customer. For example, if the control circuit 210 determines that the UAV is the least expensive product conveyance means out of three remaining vehicles (e.g., delivery cost is $2.00 for the UAV 174, while the delivery cost is $3.00 for the worker 172 and $5.00 for a third-party currier).

In the exemplary embodiment illustrated in FIG. 4, after the control circuit 210 of the central computing device 150 determines the vehicle associated with the lowest delivery cost in step 435, the control circuit 210 selects a worker 172 or unmanned delivery vehicle 174 associated with the lowest delivery risk and the lowest delivery cost as the worker 17 or unmanned delivery vehicle 174 for delivering the product 190 (i.e., pint of ice cream) to the customer from a selected retail store 160 or a selected product stocking facility 170 of the retailer (step 440). After such a worker 172 (to deliver via personal car) or unmanned vehicle 174 (e.g., UAV) is selected by the control unit 210 in step 440, the control unit 210 of the central computing device 150 causes the computing device 150 to send an electronic notification to the worker 172 or unmanned delivery vehicle 174 in order to notify such worker 172 or unmanned delivery vehicle 174 that he/she/it has been assigned the task of delivering the pint of ice cream to the customer within one hour at the customer-designated delivery destination (step 445), and to send an electronic notification to the customer in order to notify the customer that a worker 172 or unmanned delivery vehicle 174 has been assigned the task of delivering the pint of ice cream to the customer within one hour at the customer-designated delivery destination (step 450).

In certain situations, the above-discussed analysis may lead to the control unit 210 selecting a delivery vehicle that is best suited for delivering the pint of ice cream to the customer, but cannot deliver the ice cream within the time frame (i.e., one hour) specified by the customer. In some embodiments, when such a situation occurs, the control unit 210 is programmed to send an electronic notification to the customer in order to provide the customer with an alternative delivery time and enable the customer to accept or reject the proposed alternative delivery time. If the customer accepts the proposed alternative delivery time (e.g., by clicking on "YES" button in the electronic notification transmitted by the central computing device 150), the central computing device 150 then assigns delivery mission to the vehicle best suited to deliver the product 190 within the alternative time frame accepted by the customer.

In certain situations, the above-discussed analysis may lead to the control unit 210 determining that there are no delivery vehicles available to deliver the product 190 to the customer. In some embodiments, when such a situation occurs, the control unit 210 is programmed to send an electronic notification to the customer in order to provide the customer with an option to come pick up the product at the retail store 160 or product stocking location 170. If the customer accepts to pick up the product, (e.g., by clicking on "YES" button in the electronic notification transmitted by the central computing device 150), the central computing device 150 then transmits an electronic notification to the retail store 160 or product stocking facility 170 indicating that the customer will be coming in to pick up the product. If the customer does not accept to pick up the product (e.g., by clicking on "NO" button in the electronic notification transmitted by the central computing device 150, the control unit 210 of the central computing device 150 is programmed to cancel the order and inform the customer accordingly.

In one aspect, the control circuit 210 of the central computing device 150 is programmed to analyze geographic locations (e.g., global positioning system (GPS) coordinates) of the delivery location 180, retail store 160, and product stocking facility 170 to determine the retail store 160 or product stocking facility 170 located at a physical address that is geographically closest to (i.e., the shortest distance from) the delivery location 180 designated by the customer. It will be appreciated that the control circuit 210 of the central computing device 150 is programmed to analyze not only the relative geographic locations of the retail store 160, product stocking facility 170, and delivery location 180 when determining whether to select a retail store 160 or product stocking facility 170 from which to deliver the customer-ordered product(s) 190 to the delivery location 180. For example, in some embodiments, the control circuit 210 of the central computing device 150 is configured to analyze one or more additional factors based on the inventory management data obtained from the electronic database 140 in order to select the retail store 160 or product stocking facility 170 from which to deliver the product(s) 190 to the customer.

In some embodiments, the system 100 includes one or more sensors 175. The term "sensors" as used herein will be understood to include substantially any device that provides information to the central computing device 150 to be used in product and/or delivery vehicle detection, product and/or delivery vehicle environment mapping, product and/or delivery vehicle location determination, and/or other such sensor information. In some embodiments, one or more of retail store 160, product stocking facility 170, worker 172 (e.g., worker's hand-held electronic device or delivery vehicle used by the worker), and unmanned delivery vehicle 174 are provided with one or more sensors 175 including but not limited to sensors configured to detect and/or identify the products 190 stocked at the retail store 160 and the product stocking facility 170 and/or the products being transported by the worker 172 and the unmanned delivery vehicle 174. In some aspects, the sensors 175 include but are not limited to sensors that are configured to detect and/or identify the delivery vehicle (e.g., vehicle of a worker 172 and/or the unmanned delivery vehicle 174); sensors that are configured to detect location (e.g., GPS coordinates) and movement (e.g., direction of travel, speed, etc.) of the delivery vehicle, capture images and/or video (e.g., of objects around the delivery vehicle, products 190 within the delivery vehicle, etc.), capture thermographic, infrared, and/or multi spectral images; one or more accelerometers, one or more gyroscopes; one or more odometers; one or more location sensors, one or more distance measurement sensors (e.g., laser sensors, sonar sensors, sensors that measure distance by emitting and capturing a wireless signal (which can comprise light and/or sound) etc.), 3D scanning sensors, other such sensors, or a combination of two or more of such sensors.

In some embodiments, the sensors 175 are configured to scan identifying indicia located on the products 190 and/or product-containing packages that are being stocked at the retail store 160 and product stocking facility 170 and/or being transported by a delivery vehicle (e.g., worker-operated, unmanned delivery vehicle 174, third party-operated delivery vehicle, etc.). The identifying indicia on a product 190 that may be scanned by the sensors 175 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes. In some aspects, as the products 190 are being placed on a shelf or into a bin at a retail store 160 or a product stocking facility 170, the respective sensors 175 of the retail store 160 and product stocking facility 170 obtain the identity of each such product 190 and transmit a signal including an identifying characteristic and/or location of the product 190 scanned by the sensor 175 to the electronic database 140 and/or directly to the central computing device 150.

Similarly, in some aspects, when the products 190 are being loaded into and/or transported by a delivery vehicle (e.g., vehicle of a worker 172 or the unmanned delivery vehicle 174), the respective sensors 175 associated with the worker 172 and the unmanned delivery vehicle 174 obtain the identity of each such product 190 and transmit a signal including an identifying characteristic and/or location (e.g., GPS coordinates) of the product 190 scanned by the sensor 175 to the electronic database 140 and/or directly to the central computing device 150. As a result, the central computing device 150 is provided by the sensors 175 with information regarding the location of the products 190 in real-time, which advantageously enables the central computing device 150 to have access to up-to-date inventory management data when making a determination of which product storage location (e.g., retail store 160 or product stocking facility 170) to pick a product 190 from to fulfill an internet order placed by a product, and which conveyance or delivery vehicle (e.g., vehicle of a worker 172 or an unmanned delivery vehicle, etc.) to select for fulfilling this internet-based order from the selected product storage location. In some embodiments, as mentioned above, the control unit 210 of the central computing device 150 is programmed to obtain (e.g., from the sensors 175) and/or generate global positioning system (GPS) coordinates of the products 190 available to fulfill an internet-based order placed by a customer and obtain and/or generate GPS coordinates of the one or more delivery locations 180, and to analyze the obtained GPS coordinates to determine an optimal location from which to deliver the product 190 to the customer and an optimal delivery vehicle via which to deliver this product 190 to the customer.

In some aspects, the sensors 175 can detect actual physical characteristic information of the products 190 including but not limited to: dimensional characteristics (e.g., size and shape); total weight; total volume, temperature, smell; exterior texture, tamper-evidence status, etc. For example, in some embodiments, the sensors 175 are configured to recognize physical characteristic information associated with the products 190 stocked at the retail store 160 and product stocking facility 170, as well as physical characteristic information associated with products 190 being loaded into and/or transported by the delivery vehicles (e.g., unmanned delivery vehicle 174, vehicle of the worker 172, etc.). As such, the sensors 175 can facilitate detection of products 190 that are damaged (e.g., while stored at the retail store 160 or stocking facility 170, or while being transported by the worker 172 or unmanned delivery vehicle), which advantageously enables the central computing device 150 to avoid picking such products 190 to fulfill internet-based orders and to interrupt delivery of such products 190 while en route, thereby advantageously avoiding delivery of damaged products 190 to the customer.

In certain implementations, the delivery vehicles (e.g., the vehicle of a worker 172, the unmanned delivery vehicle, etc.) are equipped with one or more sensors configured to detect status information pertaining to movement of the delivery vehicles along their current routes. In some aspects, such sensors 175 include a sensor configured for measuring the speed of the delivery vehicle and a sensor that relays the GPS coordinates of the delivery vehicle. Since the GPS coordinates of the delivery location 180 is entered by the customer when placing the order over the internet, in some embodiments, the control unit 210 of the central computing device 150 is enabled by the sensor data obtained from such sensors 175 to calculate the amount of time required that would be required for the delivery vehicle to arrive at the delivery locationl 180 after picking up the product 190 at a given product stocking facility 170 or retail store 160.

In some aspects, the control circuit 210 of the central computing device 150 is programmed to analyze pending internet-based product orders being processed by the retailer. For example, the control circuit 210 of the central computing device 150 is programmed to obtain from the electronic database 140 data indicating the routes of all vehicles (e.g., vehicles of workers 172, unmanned delivery vehicles 174, and other delivery vehicles) scheduled to make deliveries in areas proximate to the delivery location 180, and to determine whether a certain retail store 160 or product stocking facility 170 stocking the products 190 ordered by a customer in the delivery location 180 is so aligned with a route of a given delivery vehicle to justify stopping the delivery vehicle at that retail store 160 or product stocking facility 170 in order to pick up the products 190 ordered by the customer therefrom, and to deliver the products 190 via that delivery vehicle to the customer at the delivery location 180 at a minimum additional transportation cost to the retailer.

In some aspects, the control circuit 210 of the central computing device 150 is programmed to analyze the cost of delivering a product 190 ordered by the customer to the delivery location 180 designated by the customer from a retail store 160 or product stocking facility 170 via a worker 172 available at the retail store 160 or product stocking facility 170, or via unmanned delivery vehicle 174 available for delivering the products 190. For example, in some configurations, after performing an analysis of the cost of delivering the products 190 ordered online by the customer to the delivery location 180 designated by the customer, the control circuit 210 of the central computing device 150 is configured to select a retail store 160 or product stocking facility 170 associated with the lowest cost to the retailer of delivering the products 190 to the delivery location 180. By the same token, after performing an analysis of the cost of delivering the products 190 ordered online by the customer to the delivery location 180 designated by the customer, the control circuit 210 of the central computing device 150 is configured to select a worker 172 or unmanned delivery vehicle 174 for delivering the customer-ordered products 190 to the delivery location 180 based on which delivery option (i.e., worker 172 or unmanned delivery vehicle 174) is determined by the control circuit 210 of the central computing device 150 to be associated with a lowest cost to the retailer of delivering the products 190 to the customer.

In some aspects, the control circuit 210 of the central computing device 150 is programmed to analyze delivery restrictions associated with the customer who purchased the product(s) 190 from the retailer via the internet-based order. In other words, the control circuit 210 of the central computing device 150 is programmed to analyze the possible obstacles that may prevent, delay, and/or increase the cost of delivery of the products 190 to the delivery location 180 from the retail store 160 or product stocking facility 170 (e.g., via a worker 172 of the retail store 160 or product stocking facility 170 or via an unmanned delivery vehicle 174). Such possible delivery restrictions may include but are not limited to: buildings, other structures, no fly zones, access-restricted areas (e.g., secure buildings or gated communities), or the like. For example, in some configurations, after determining that a product stocking facility 170 represents the optimal location from which to deliver the products 190 ordered online by the customer to the delivery location 180 designated by the customer, the control circuit 210 of the central computing device 150 is configured to select an unmanned delivery vehicle 174 instead of a worker 172 for delivering the customer-ordered products 190 from the product stocking facility 170 to the delivery location 180 based on a determination by the control circuit 210 that the worker 172 would not be able to gain access to the delivery location 180 (which is a house located within a gated community).

In some embodiments, the control circuit 210 of the central computing device 150 is configured to preferentially select the product stocking facility 170 over the retail store 160 during a selection, by the control circuit 210 of a facility from which to deliver the customer's online-ordered products 190 to the delivery location 180 designated by the customer. In other words, when it is equally economical (e.g., in terms of cost to the retailer) and efficient (e.g., in terms of order fulfillment time) for a product 190 to be delivered to the delivery location 180 designated by the customer from a given retail store 160 and a given product stocking facility 170 the control circuit 210 is programmed to preferentially select the product stocking facility 170 as the location from which the product 190 is picked for delivery to the customer. As a result of the control circuit 210 of the central computing device 150 preferentially selecting a product stocking facility 170 over a retail store 160, orders placed online by the customers of the retailer are preferentially filled by products 190 stocked at the product stocking facility 170 while preserving the products 190 stocked (on the sales floor or in a stock room) at the retail store 160. In other words, products 190 that were transported to the retail store 160 with the purpose of being offered on the sales floor of the retail store 160 to the customers (or being stocked in the stock room to serve as replenishment inventory) do not have to be re-transported from the retail store 160 to fulfill an online delivery order and do not require additional replenishment products 190 to be transported to the retail store 160 to insure that the retail store 160 (which lost some of its inventory to fulfillment of online delivery orders) possesses a sufficient number of products 190 to satisfy the demand by in-store customers.

It will be appreciated, however, that the system 100 does not preclude filling an online order via a product 190 that is stocked at the retail store 160 when such fulfillment is calculated by the control circuit 210 of the central computing device 150 to be more economical and/or efficient than fulfillment of the online order via a product 190 that is stocked at the product stocking facility 170. For example, in some embodiments, the control circuit 210 of the central computing device 150 is configured to select the retail store 160 instead of the product stocking facility 170 as the location from which a product 190 is drawn to be delivered to the customer to fulfill an online order upon a determination, by the control circuit 210, that delivery of the product 190 from the selected retail store 160 is more economical (e.g., cheaper) for the retailer than delivery of the product 190 from any of the product stocking facilities 170. In some embodiments, for perishable products 190 having a shorter shelf life, the control circuit 210 of the central computing device 150 is configured to preferentially select the retail store 160 (e.g., a shelf on the sales floor) over the product stocking facility 170 during a selection, by the control circuit 210 of a facility from which to deliver the customer's online-ordered products 190 to the delivery location 180 designated by the customer, thereby possibly avoiding spoilage of the product 190 (e.g., if the product 190 picked from the retail store 160 is near its expiration date), and advantageously optimizing profit of the retail store 160. In some embodiments, for perishable products 190, the control circuit 210 of the central computing device 150 is configured to preferentially select the retail store 160 having an older (yet adequately fresh) product 190 over another retail store 160 having a newer product 190 (i.e., further away from its expiration date) during a selection, by the control circuit 210 of a facility from which to deliver the customer's online-ordered products 190 to the delivery location 180 designated by the customer, thereby reducing the number of perishable products 190 that are allowed to be expired.

In some embodiments, after the control circuit 210 of the central computing device 150 selects a retail store 160 instead one of a product stocking facility 170 as a facility from which the product 190 ordered online by the customer is to be delivered to the delivery location 180 designated by the customer, the control circuit 210 of the central computing device 150 is programmed to preferentially select to pick the product 190 from a stock room of the retail store 160 instead of from a shelf on a sales floor of the retail store 160. As such, when the central computing device 150 determines that it would be most economical and/or efficient to fulfill an online order from the retail store 160 instead of a product stocking facility 170, the online order is preferentially fulfilled by taking the products 190 to be delivered to the customer from the stock room (not the sales floor), thus leaving the product 190 that is displayed on the sales floor of the retail store 160 in its place on the sales floor shelf to be potentially purchased by in-store customers.

In some embodiments, the control circuit 210 of the central computing device 150 is programmed to generate and transmit an electronic notification (e.g., alert) in connection with determination of a facility (e.g., retail store 160 or product stocking facility 170) from which a product 190 ordered by the customer is going to be delivered to the delivery location 180 designated by the customer. In the embodiment illustrated in FIG. 1, the electronic notification may be transmitted via the network 125 from the central computing device 150 to electronic devices including but not limited to: computing device at a retail store 160, computing device at a product stocking facility 170, electronic device of a worker 172, unmanned delivery vehicle 174.

For example, the central computing device 150 can transmit a signal over the network 125 to an electronic device of a worker 172 at the product stocking facility 170 to inform the worker 172 that he has been selected to deliver a product 190 ordered online by a customer to a delivery location 180 designated by the customer. Similarly, the central computing device 150 can transmit a signal over the network 125 to a computing device at the product stocking facility 170 to inform the product stocking facility 170 that its worker 172 has been selected to deliver a product 190 ordered online by a customer to a delivery location 180 designated by the customer. In some aspects, the electronic notification transmitted from the central computing device 150 to the electronic device of the worker 172 and/or the computing device at the product stocking facility 170 includes a delivery address of the customer to which the delivery is to be made, and a time frame for delivering the product 190 to the customer (if the online order included a specific time frame within which the product 190 is to be delivered to the delivery location 180). In some embodiments, the electronic notifications sent by the central computing device 150 over the network 125 include but are not limited to short message service (SMS) messages, electronic mail (e-mail) messages, instant messenger messages, voice mail messages, and/or push notifications.

In some embodiments, the control circuit 210 of the central computing device 150 is configured to receive an acknowledgment from an electronic device of the worker 172 and/or a computing device at the product stocking facility 170 indicating that the instruction to deliver a product from the product stocking facility 170 to the delivery location 180 has been received from the central computing device 150. In one aspect, if the central computing device 150 receives an electronic notification from the electronic device of the worker 172 or the computing device at the product stocking facility 170 indicating that the worker 172 is not available (or will otherwise be unable) to deliver the product 190, the control circuit 210 of the central computing device 150 is programmed to obtain inventory management data from the electronic database 140 in order to determine another worker located at the product stocking facility 170 that is available to deliver the product 190 from the product stocking facility 170 to the delivery location 180 designated by the customer. In some embodiments, if no workers 172 are available at a given product stocking facility 170 to deliver the product 190 to the customer, the control circuit 210 of the central computing device 150 is programmed to analyze inventory and worker availability at nearby product stocking facilities 170 and/or retail stores 160, and to select an alternative product stocking facility 170 and/or retail store 160 from which to deliver the product 190 to the customer.

As discussed above, the electronic database 140 can include customer demand forecast data associated with the products 190 stocked at the retail stores 160 of the retailer and the product stocking facilities 170. In some aspects, such customer demand forecast data is obtained from the electronic database 140 by the central computing device 150 when determining whether to draw products 190 from a given retail store 160 or a given product stocking facility 170 whether fulfilling online orders and/or replenishing products on a sales floor of a retail store 160. For example, the control circuit 210 of the central computing device 150 is programmed, in some configurations, to obtain the customer demand forecast data from the electronic database 140 and to allocate the products 190 between the retail stores 160 and product stocking facilities 170 based on the customer demand forecast data obtained from the electronic database 140. As such, when the customer demand forecast data obtained from the electronic database 140 indicates a projected large increase in online orders for a given product 190 in one week, the central computing device 150 can allocate more units of that product 190 to be stored at product stocking facilities 170 to avoid having to draw excessive units of that product 190 from the retail stores 160 and avoid situations where the retail stores 160 run out of or are too low in inventory of that product 190 and the in-store customers are unable to buy this product 190 due to the high online demand.

Figure 3:
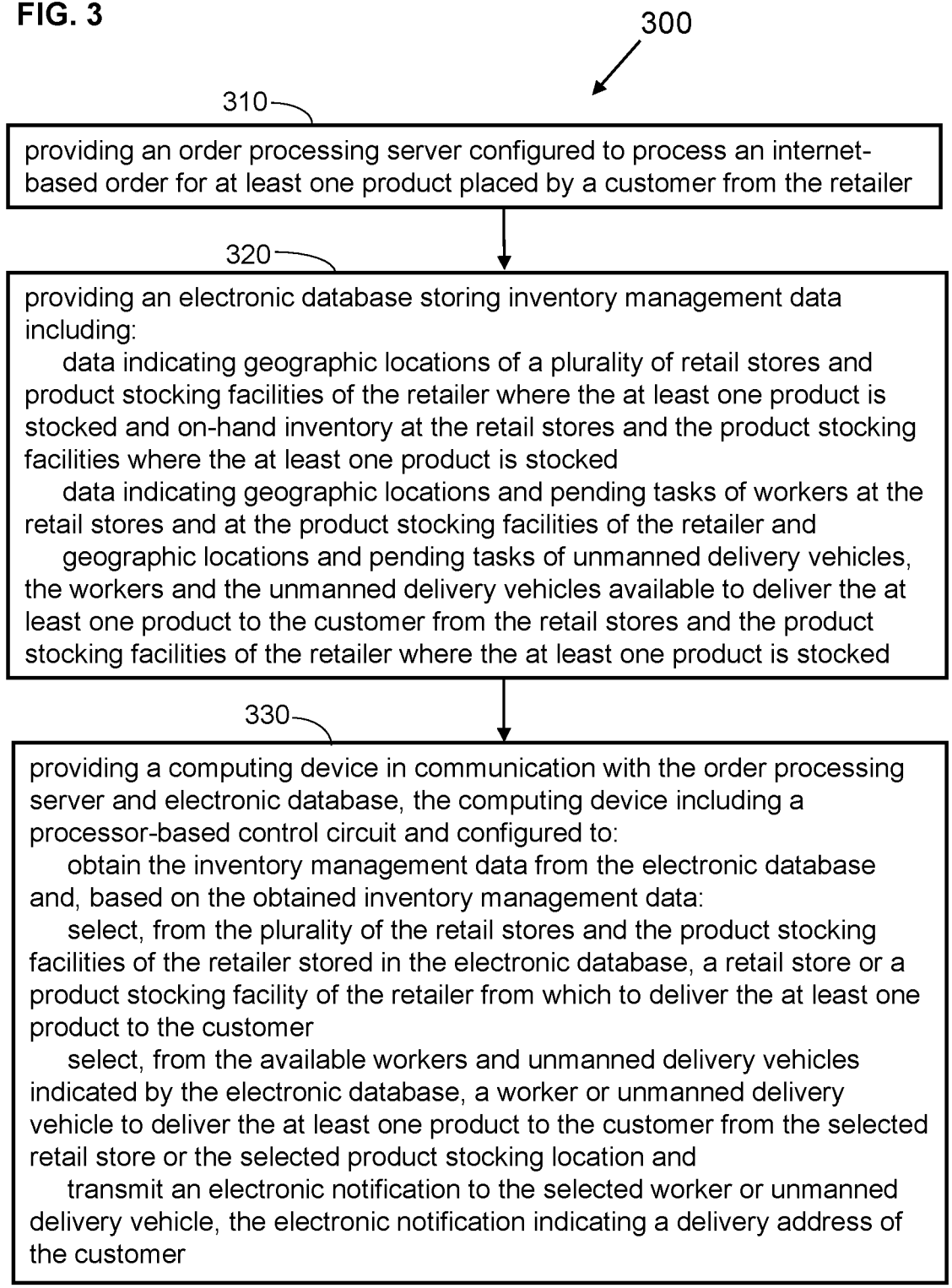
FIG. 3 is a flow chart diagram of facilitating delivery of products purchased by the customers over the internet from product stocking facilities o the retailer via a worker of a product stocking facility or an unmanned delivery vehicle in accordance with some embodiments.

FIG. 3 shows an embodiment of a method 300 of facilitating delivery of products 190 purchased by customers from a retailer via internet-based orders. The exemplary method 300 includes providing an order processing server 130 configured to process an internet-based order for one or more product 190 placed by a customer from the retailer (step 310). As discussed above, when a customer orders a product 190 online via an order processing server 130, the product 190 is delivered to the customer from a location (e.g., product stocking facility 170 or retail store 160) and via a delivery carrier (e.g., worker 172 or unmanned delivery vehicle 174) that is determined to represent the most cost-effective and efficient location and carrier for that delivery.

In order to facilitate this determination, the exemplary method 300 includes providing an electronic database 140 storing inventory management data (step 320) and providing a central computing device 150 in communication with the order processing server 130 and the electronic database 140 (step 330). As discussed in more detail above, the central computing device 150 is configured to obtain inventory management data from the electronic database 140 and, based on the delivery location 180 where the customer wants the product 190 delivered (and, in some cases, also based on delivery timing requirements set by the customer), the central computing device 150 selects a location (e.g., product stocking facility 170 or retail store 160) that serves as the optimal (e.g., most cost-effective) location from which to deliver the product 190 to the customer, as well as a delivery carrier (e.g., worker 172 or unmanned delivery vehicle 174) that serves as the most cost-effective and efficient agent for delivering the product 190.

For example, in some embodiments, after a customer purchases a product 190 from the retailer via the order processing server 130 of the retailer and elects (via the graphical interface 122 of the customer computing device 120) to have the products 190 ordered by the customer delivered to a delivery location 180 selected by the customer, the central computing device 150 obtains inventory management data from the electronic database 140 relevant to making a determination as to from which location (e.g., retail store 160 or product stocking facility 170) to fulfill this order. The inventory management data obtained by the central computing device 150 from the electronic database 140 can include data indicating geographic locations of the retail stores 160 and product stocking facilities 170 where the product 190 ordered online by the customer is stocked, as well as data indicating on-hand inventory at such retail stores 160 and product stocking facilities 170.

The inventory management data obtained by the central computing device 150 from the electronic database 140 can also include data indicating geographic locations and pending tasks of workers 172 at the retail stores 160 and product stocking facilities 170 of the retailer, as well as geographic locations and pending tasks of unmanned delivery vehicles 174 that are configured for delivering products 190 to customers from the retail stores 160 and/or product stocking facilities 170 of the retailer. In one aspect, to save system resources and increase processing speed, instead of obtaining inventory management data stored in the electronic database 140 with respect to all retail stores 160 and all product stocking facilities 170 of the retailer in the country or state, the central computing device 150 obtains inventory management data with respect to retail stores 160 and/or product stocking facilities 170 located within a predetermined radius (e.g., 5 miles, 10 miles, 25 miles, 50 miles, or more) relative to the delivery location 180 where the customer wants the product 190 to be delivered.

In the exemplary method 300 of FIG. 3, after the central computing device 150 obtains the aforementioned inventory management data from the electronic database 140, the central computing device 150 analyzes the obtained inventory management data in order to determine which product stocking facility 170 of the retailer is optimal for serving as the facility from which the product 190 ordered by the customer is delivered to the delivery location 180 designated by the customer. In addition, after the central computing device 150 determines which product stocking facility 170 of the retailer will serve as the facility from which the product 190 ordered by the customer is delivered to the delivery location 180 designated by the customer, the central computing device 150 analyzes the inventory management data and selects, from the available workers 172 and unmanned delivery vehicles 174 listed in the electronic database 140, a worker 172 or unmanned delivery vehicle 174 to deliver the product 190 to the customer from the selected product stocking facility 170 or the selected retail store 160. The analysis underlying these determinations has been described in detail above and will not be reproduced here.

In the exemplary method 300 of FIG. 3, after the central computing device 150 determines, based on the inventory management data obtained from the electronic database 140, the product stocking facility 170 or retail store 160 from which the product 190 is to be delivered to the customer and the worker 172 or unmanned delivery vehicle 174 that will deliver the product 190 to the customer from the selected product stocking facility 170 or the selected retail store 160, the central computing device 150 transmits, over the network 125 an electronic notification to the selected worker 172 or unmanned delivery vehicle 174 to indicate a delivery location 180 (e.g., street address) designated by the customer. Such a notification can be transmitted by the central computing device 150 directly to the electronic device of the worker 172 or the unmanned delivery vehicle 174 directly, or via the computing device located at the retail store 160 or product stocking facility 170 selected by the central computing device 150 as the location from which the product 190 is to be delivered to the customer.

In one aspect, after the worker 172 receives such an electronic notification from the central computing device 150 over the network 125, the worker 172 can use the electronic device of the worker 172 to transmit a signal to the central computing device 150 indicating availability/unavailability of the worker 172 to deliver the product 190 to the customer. Similarly, after the product stocking facility 170 or retail store 160 receives such an electronic notification from the central computing device 150 over the network 125, a computing device at the product stocking facility 170 or retail store 160 can be used to transmit a signal to the central computing device 150 indicating ability/inability of the product stocking facility 170 or retail store 160 to fulfil the delivery of the product 190 to the customer. Then, in some embodiments, the central computing device 150 receives the response transmitted from the electronic device of the worker 172 or the computing device of the product stocking facility 170 or retail store 160.

The systems and methods described herein advantageously enables retailers to fulfil online orders using product stock from facilities that are separate from the retail stores of the retailer. Accordingly, the systems and methods described herein improve the efficiency of product delivery systems by eliminating unnecessary and/or duplicative stocking/restocking/transportation of products and enable the retail stores to use their inventory for in-store customer purchases. As such, the systems and methods provided herein result in significant time and cost savings to the retailers and increase the chances that retail stores carry sufficient inventory for in-store customers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating delivery to customers of products purchased by the customers of a retailer via internet-based orders, the system comprising:
an order processing server configured to process an internet-based order for at least one product placed by a customer of the retailer, the order processing server being configured to permit a customer computing device to access the order processing server via a graphical interface generated on the customer computing device in response to a signal sent to the customer computing device by the order processing server, the graphical interface generated on the customer computing device including at least one input field configured to permit the customer to place the order for the at least one product and to elect to have the at least one product ordered by the customer be delivered to the customer, and select a specific retail store from which the at least one product ordered by the customer is to be delivered to the customer, wherein, when the customer selects within the graphical interface the specific retail store from which the at least one product ordered by the customer is to be delivered to the customer, the graphical interface is configured to generate a graphical element indicating a delivery surcharge payable by the customer to the retailer for being permitted to select the specific retail store from which the at least one product ordered by the customer is to be delivered to the customer;
an electronic database storing inventory management data including:
data indicating geographic locations of a plurality of retail stores where the at least one product is stocked;
data indicating on-hand inventory at the retail stores where the at least one product is stocked;
data indicating a time frame within which the at least one product is to be delivered to the customer;
data indicating geographic locations of delivery vehicles, direction of travel of the delivery vehicles, speed of travel of the delivery vehicles, objects around the delivery vehicles, and pending tasks of the delivery vehicles, the delivery vehicles being available to deliver the at least one product to the customer from the retail stores where the at least one product is stocked,
wherein the delivery vehicles each include at least one sensor configured to:
indicate a geographic location of the delivery vehicles, indicate a direction of travel of the delivery vehicles, indicate a speed of travel of the delivery vehicles, and detect at least one object around the delivery vehicles; and
transmit electronic data indicating the geographic location of the delivery vehicles, the direction of travel of the delivery vehicles, the speed of travel of the delivery vehicles, and the at least one object detected around the delivery vehicles to the electronic database for storage; and
a computing device in communication with the order processing server and the electronic database, the computing device including a processor-based control circuit, wherein, in response to receipt of a signal from the order processing server indicating that the customer placed an order for the at least one product and elected to have the at least one product ordered by the customer be delivered to the customer, the computing device is configured to:
obtain the inventory management data from the electronic database; and
based on the obtained inventory management data to:
generate a list of the delivery vehicles that are capable of delivering the at least one product to the customer;
determine a delivery risk associated with delivering the at least one product to the customer via each of the delivery vehicles on the generated list;
determine a cost of delivering the at least one product to the customer via each of the delivery vehicles on the generated list;
based on the determined delivery risk associated with delivering the at least one product to the customer via each of the delivery vehicles on the generated list and based on the determined cost of delivering the at least one product to the customer via each of the delivery vehicles on the generated list:
generate a combined cost-of-delivery and delivery-risk factor score for each of the delivery vehicles on the generated list; and
generate a ranking of the combined cost-of-delivery and delivery-risk factor score for each of the delivery vehicles on the generated list;
select, from the ranking of the combined cost-of-delivery and delivery-risk factor score for each of the delivery vehicles, a delivery vehicle associated with a ranking corresponding to the lowest combined cost-of-delivery and delivery-risk factor score as the delivery vehicle to deliver the at least one product to the customer; and
generate by the computing device and transmit from the computing device an electronic notification including:
an instruction to use the selected delivery vehicle to deliver the at least one product to the customer; and
an indication of a delivery address of the customer.

2. The system of claim 1, wherein the control circuit of the computing device is configured to analyze at least one of the following additional factors based on the obtained inventory management data in order to select the delivery vehicle to deliver the at least one product:
pending internet-based product orders being processed by the retailer; and
delivery restrictions associated with the customer who purchased the at least one product from the retailer via the internet-based order.

3. The system of claim 1, wherein the electronic notification further indicates a time frame within which the at least one product is to be delivered to the customer.

4. The system of claim 1, wherein the electronic database further includes:
data indicating geographic locations of a plurality of product stocking facilities where the at least one product is stocked; and
data indicating on-hand inventory at the product stocking facilities where the at least one product is stocked.

5. The system of claim 4, wherein the product stocking facilities include at least one of: a distribution center of the retailer, a fulfillment center of the retailer, and a mobile storage station of the retailer.

6. The system of claim 4, wherein the electronic database further comprises customer demand forecast data associated with products stocked at the product stocking facilities.

7. The system of claim 1, wherein the electronic database further comprises customer demand forecast data associated with products stocked at the retail stores.

8. The system of claim 7, wherein the computing device is configured to:
   obtain the customer demand forecast data from the electronic database; and
   allocate the products between the retail stores based on the customer demand forecast data obtained from the electronic database.

9. A method for facilitating delivery to customers of products purchased by the customers of a retailer via internet-based orders, the method comprising:
   providing an order processing server configured to process an internet-based order for at least one product placed by a customer of the retailer;
   permitting a customer computing device to access the order processing server by sending a signal from the order processing server to the customer computing device, the signal configured to generate a graphical interface on the customer computing device, the graphical interface generated on the customer computing device including at least one input field configured to permit the customer to place the order for the at least one product, elect to have the at least one product ordered by the customer be delivered to the customer, and select a specific retail store from which the at least one product ordered by the customer is to be delivered to the customer, wherein, when the customer selects within the graphical interface the specific retail store from which the at least one product ordered by the customer is to be delivered to the customer, the graphical interface is configured to generate a graphical element indicating a delivery surcharge payable by the customer to the retailer for being permitted to select the specific retail store from which the at least one product ordered by the customer is to be delivered to the customer;
   providing an electronic database storing inventory management data including:
      data indicating geographic locations of a plurality of retail stores where the at least one product is stocked;
      data indicating on-hand inventory at the retail stores where the at least one product is stocked;
      data indicating a time frame within which the at least one product is to be delivered to the customer;
      data indicating geographic locations of delivery vehicles, direction of travel of the delivery vehicles, speed of travel of the delivery vehicles, objects around the delivery vehicles, and pending tasks of delivery vehicles, the delivery vehicles being available to deliver the at least one product to the customer from the retail stores where the at least one product is stocked;
   providing each of the delivery vehicles with at least one sensor configured to:
      indicate a geographic location of the delivery vehicles, indicate a direction of travel of the delivery vehicles, indicate a speed of travel of the delivery vehicles, and detect at least one object around the delivery vehicles; and
      transmit electronic data indicating the geographic location of the delivery vehicles, the direction of travel of the delivery vehicles, the speed of travel of the delivery vehicles, and the at least one object detected around the delivery vehicles to the electronic database for storage;
   providing a computing device in communication with the order processing server and the electronic database, the computing device including a processor-based control circuit;
   by the computing device, and in response to receipt of a signal from the order processing server indicating that the customer placed an order for the at least one product and elected to have the at least one product ordered by the customer be delivered to the customer:
      obtaining the inventory management data from the electronic database; and
      based on the obtained inventory management data:
         generating a list of the delivery vehicles that are capable of delivering the at least one product to the customer;
         determining a delivery risk associated with delivering the at least one product to the customer via each of the delivery vehicles on the generated list;
         determining a cost of delivering the at least one product to the customer via each of the delivery vehicles on the generated list;
         based on the determined delivery risk associated with delivering the at least one product to the customer via each of the delivery vehicles on the generated list and based on the determined cost of delivering the at least one product to the customer via each of the delivery vehicles on the generated list:
            generating a combined cost-of-delivery and delivery-risk factor score for each of the delivery vehicles on the generated list; and
            generating a ranking of the combined cost-of-delivery and delivery-risk factor score for each of the delivery vehicles on the generated list;
            selecting, from the ranking of the combined cost-of-delivery and delivery-risk factor score for each of the delivery vehicles, a delivery vehicle associated with a ranking corresponding to the lowest combined cost-of-delivery and delivery-risk factor score as the delivery vehicle to deliver the at least one product to the customer; and
            generating and transmitting an electronic notification including:
               an instruction to use the selected delivery vehicle to deliver the at least one product to the customer; and
               an indication of a delivery address of the customer.

10. The method of claim 9, further comprising, analyzing, by the control circuit of the computing device, at least one of the following additional factors based on the obtained inventory management data in order to select the delivery vehicle to deliver the at least one product:
   pending internet-based product orders being processed by the retailer; and delivery restrictions associated with the customer who purchased the at least one product from the retailer via the internet-based order.

11. The method of claim 9, wherein the electronic notification further indicates a time frame within which the at least one product is to be delivered to the customer.

12. The method of claim 9, further comprising storing on the electronic database:
   data indicating geographic locations of a plurality of product stocking facilities where the at least one product is stocked; and
   data indicating on-hand inventory at the product stocking facilities where the at least one product is stocked.

13. The method of claim 12, wherein the product stocking facilities include at least one of: a distribution center of the retailer, a fulfillment center of the retailer, and a mobile storage station of the retailer.

14. The method of claim 12, further comprising storing on the electronic database customer demand forecast data associated with products stocked at the product stocking facilities.

15. The method of claim 9, further comprising storing on the electronic database customer demand forecast data associated with products stocked at the retail stores.

16. The method of claim 15, further comprising:
   obtaining, by the computing device, the customer demand forecast data from the electronic database; and
   allocating the products between the retail stores based on the customer demand forecast data obtained from the electronic database.

\* \* \* \* \*

UNITED STATES PATENT AND TRADEMARK OFFICE
CERTIFICATE OF CORRECTION

Page 1 of 1

PATENT NO. : 11,100,462 B2
APPLICATION NO. : 16/990361
DATED : August 24, 2021
INVENTOR(S) : Donald R. High et al.

It is certified that error appears in the above-identified patent and that said Letters Patent is hereby corrected as shown below:

In the Claims

On Column 21, Line 19, delete "product and to elect" and insert --product, elect--, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*